INVENTOR.
LEONARD M. TODD

INVENTOR.
LEONARD M. TODD

*INVENTOR.*
LEONARD M. TODD

United States Patent Office 3,445,600

Patented May 20, 1969

3,445,600

TELEPHONE ANSWERING DEVICE

Leonard M. Todd, 424 W. 119th St., New York, N.Y. 10027

Filed Aug. 7, 1964, Ser. No. 388,091
Int. Cl. H04m *11/10*
U.S. Cl. 179—6 5 Claims

ABSTRACT OF THE DISCLOSURE

A telephone answering device wherein ringing current causes line seizure and starts an endless tape to play a prerecorded announcement. After the announcement, impulse generating means on the endless tape starts a message recorder. After predetermined message time, second impulse generating means further along the endless tape returns the device to standby. Each of a plurality of spaced apart impulse generating and time determining means on the message recorder tape passing an impulse sensitive element also returns the device to standby.

This invention is a telephone answering device for performing a series of operations, line seizure, transmitting an announcement over the telephone line to the calling party, recording a calling party's messages from the line, releasing line seizure and stopping the machine.

It is an object of this invention to accomplish these results in a novel manner with a minimum of equipment, thereby improving reliability and decreasing cost of the equipment.

It is an object of this invention to utilize either the announcement tape or both the announcement tape and the message tapes as determinants of announcement and message duration.

It is an object of this invention to utilize duration determining impulse generating portions appropriately spaced on said tapes to actuate impulse sensitive elements adjacent said tapes and switching means to turn on and off the appropriate functions of the answering device when actuated by said impulse generating portions at the conclusion or start of said announcement and message periods.

It is an object of this invention to connect the answering device directly to the telephone line where the tariff's permit or to the telephone line through the recorder coupler furnished by the telephone company under their tariffs.

It is another object of this invention to furnish means whereby the number of messages which have been recorded may be determined by the calling party.

Figures 1, 2:
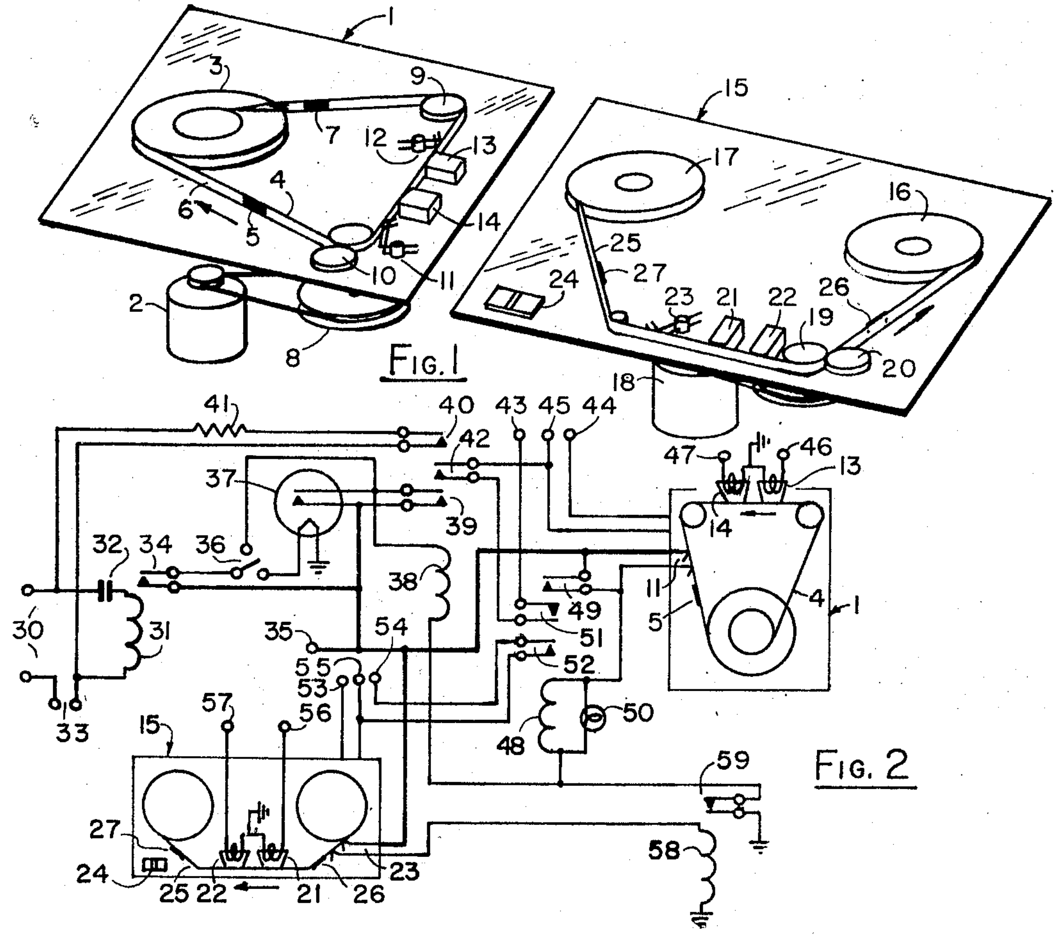
FIGURE 1 is a view of the physical arrangement of the endless loop announcement tape deck and the message record tape deck.
FIGURE 2 is a circuit diagram of the switching arrangement of the tape decks wherein the endless loop announcement tape determines the duration of the announcement and the message tape determines the duration of the messages.

FIGURE 1 shows endless loop announcement tape deck 1, motor 2, endless loop reel 3, announcement tape 4, sensing tape 5 on outer portion of tape 4, message timing tape 6, sensing tape 7 on inner portion of tape 6, drive pulley 8, idler wheels, 9 and 10, outer sensing tape switch 11, inner sensing tape switch 12, erase head 13 and record/playback head 14.

Figures 5, 6:
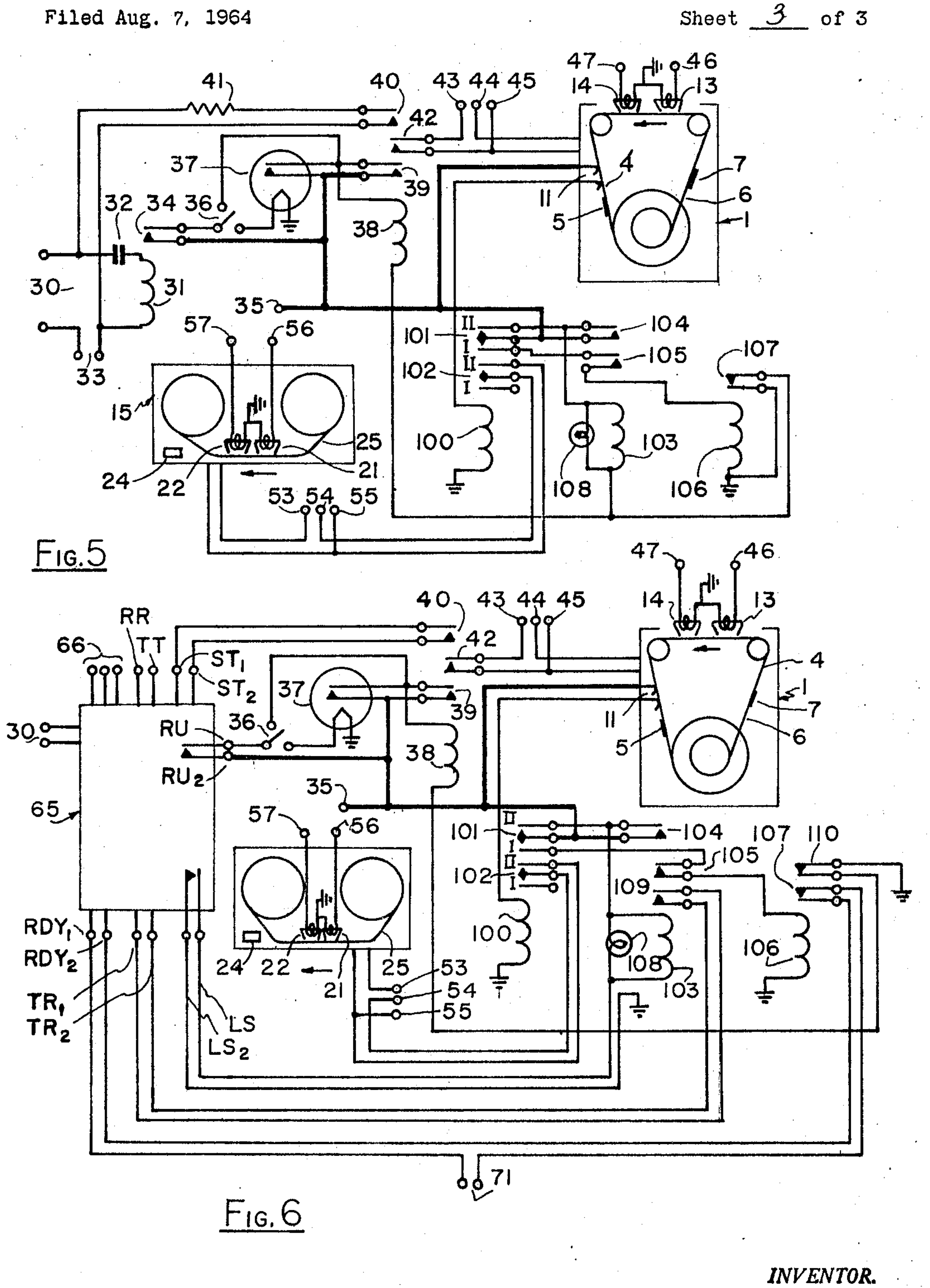
FIGURE 5 is a circuit diagram of the switching arrangement of the tape decks wherein the device is connected directly to the telephone line and the endless tape times both the announcement and message duration utilizing one switch in the endless loop announcement tape deck.
FIGURE 6 is a circuit diagram of the switching arrangement of the tape decks wherein the device is used with the recorder coupler and the endless tape times both the announcement and message duration utilizing one switch in the endless loop announcement tape deck.

While two sensing tape switches are shown in the FIG. 1 endless loop announcement tape deck 1, in FIGS. 2, 5 and 6 only one sensing tape switch is required in announcement tape deck 1. Other impulse sensitive elements rather than sensing tape and switch may be used, for example, a transparent portion on the tape in conjunction with a light, photoelectric cell and relay, a hole or notch in the tape in conjunction with switch contacts on either side of the tape, closing through said hole or notch when these pass the switch contacts, a raised portion of tape actuating a moving arm switch, a cueing tone on the tape actuating a playback head and amplifier-relay, and so forth. Sensing tape means shown here is practical and preferred.

Message recording tape deck 15 contains supply reel 16, take up reel 17, drive motor 18, capstan 19, idler wheel 20, erase head 21, record/playback head 22 and sensing tape switch 23. Rewind lever 24 may be coupled mechanically to a reversing mechanism or electrically coupled to a reversing solenoid or reversing motors of usual design. Reel drives are of usual design. Tape 25 has many uniformly spaced apart sensing tape lengths located thereon of which 26 and 27 appear; between each of these, one message is recorded. This is for FIG. 2 only; sensing tape lengths are not used on message deck 15 for FIGS. 5 and 6. Furthermore, it is possible to use an endless loop for message record deck 15 using a plurality of equally spaced apart lengths of sensing tape as in FIG. 2 and a fast forward mechanism to return the tape to the initial position to play back messages. The endless loop message record is more practical with message decks of FIGS. 5 and 6 wherein no sensing tape is used for message duration determining in the message deck, but one length of sensing tape may be used to stop the tape at its initial position. In FIGS. 5 and 6 no sensing tape or switches are shown in message decks 15.

In endless loop announcement deck 1, endless tape 4 in FIG. 2 may be longer than one announcement, say 20 announcements repeated, with sensing tape lengths at the end of each announcement, where the words may appear ". . . you have 30 seconds to record your message. 19." The "19" indicates the 19th in a series of the machine's capacity of 20. A beep tone may be provided at the end of the announcement, on the announcement tape in FIG. 2. In FIG. 5, a beep tone, if desired, may be recorded at the conclusion of the announcement and at the conclusion of the message period. The recorder coupler described below will provide a beep tone automatically.

It is possible in this invention to use a conventional tape deck with supply and take up reels for the announcement tape deck using a plurality of equally spaced apart lengths of sensing tape for determining the duration of each announcement. That is, two similar decks 15. However, this is a cumbersome arrangement requiring rewinding of an additional tape.

Figure 4:
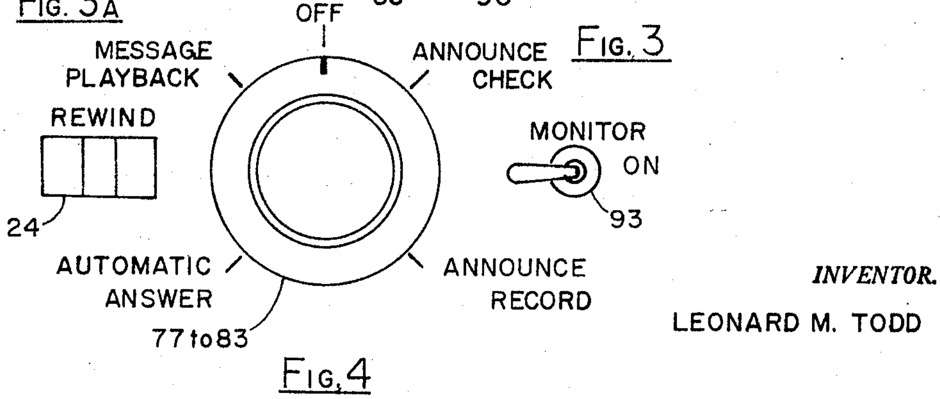
FIGURE 4 shows the panel diagram with markings indicating the function and position of the multigang rotary switch and the rewind switch.

In FIG. 2, telephone line 30 is connected to ring up relay 31 through condenser 32 and ready terminals 33 which are shunted as described later by a switch in FIG. 4. A ring up signal causes relay contacts 34 to close, causing relay current to flow from supply terminal 35 through single pole double throw switch 36, in the delay position, through the heater element of thermostatic time delay switch 37. After a delay of say 5 seconds, delay switch 37 contacts close, latching relay 38 by closing normally open contacts 39. With switch 36 in the no delay position, relay 38 latches immediately when ring up current is received.

Thermostatic delay switch 37 and relay 38 comprise time delay latching means and other time delay relays may be used, such as Heinemann Silic-O-Netic Relay, but this relay does not permit immediate latching on ring up if this is desired.

Contacts 40 of relay 38 cause line seizure of telephone line 30 through resistance 41 in the order of 300 ohms. Contacts 42 close and furnish alternating current to motor 2 of announce tape deck 1 through normally closed contacts 51 from terminals 43 and 44 which connect to switching and power supply in FIG. 3, described later, as does terminal 45 which is used to operate deck 1 for announcement record and check.

Announcement tape 4 starts its cycle and plays its announcement to the caller; at the end of this period, sensing tape switch 11 contacts are shorted by sensing tape 5. Erase head 13 and record/playback head 14 are connected to the switching arrangement and amplifiers in FIG. 3, described later, through terminals 46 and 47. Closure of switch 11 causes current flow through relay 48 and normally closed contacts 59 from supply terminal 35, latching this relay through normally open contacts 49. Lamp 50 remains lit during the message recording period, which is a convenience to the user when recording an announcement. Normally closed contacts 51 open and stop the motor of the announcement tape deck 1 and contacts 52 close and supply alternating current to the motor of message record deck 15 through terminals 53 and 54 which connect to switching and power supply in FIG. 3, described later as does terminal 55 which is used to operate message record deck 15 for message playback.

Tape 25 starts through a cycle to record a caller's message, through erase head 21 and record/playback head 22 which are connected to the switching arrangement and amplifiers in FIG. 3, described later, through terminals 56 and 57, respectively. At the conclusion of the message recording period, sensing tape 26 on message record tape 25 passes sensing tape switch 23, shorting the contacts and permitting relay current to flow from terminal 35 through relay 58 thereby opening normally closed contacts 59. Current through relays 38 and 48 is stopped and they unlatch, stopping message tape deck 15 and releasing line seizure through contacts 40. The device is now restored to normal automatic answering position.

A brief description of recorder coupler 65 in connection with this device can be understood with reference to FIG. 6. The functioning of this coupler is described in publications of the American Telephone & Telegraph Company and is a public record in accordance with tariffs filed with the Federal Communications Commission and various state public utility commissions. "Ready" terminals RDY1 and RDY2, when closed permit the actuation of the unit by a ring up signal. When this is received, contacts within the coupler connected to terminals LS and LS2 close after line seizure. When a ring up signal is received, normally open contacts within the coupler, connected to terminals RU and RU2 are closed. When "Start" terminals are shunted, ST and ST1, line seizure is effected, permitting the cycle to begin. When RDY1 and RDY2 are opened for a minimum of two seconds, line seizure is released and the internal contacts connected to LS and LS2 are opened. The coupler also provides unilateral transmission through terminals RR and TT from the answering announcement tape deck to the telephone line during the announcement period and transmission from the telephone line to the message record deck during the message record period, through the use of a unity gain amplifier and a turnaround relay. At the start of the message record period, a tone generator transmits a beep tone for one second to the telephone line upon being actuated by an impulse to the transfer terminals TR1 and TR2, which also turns the amplifier around. At the conclusion of the message record period, a beep tone for one second is again transmitted to the telephone line by the disconnect signal which comprises opening RDY1 and RDY2. Furthermore, with the ready terminals connected and a ring up signal is received, battery current to the associated telephone set is removed so that the set can be used to monitor the call but cannot record the conversation. Other terminals and functions are provided but are not essential for an understanding of this invention.

Figures 3, 3A, 3B:
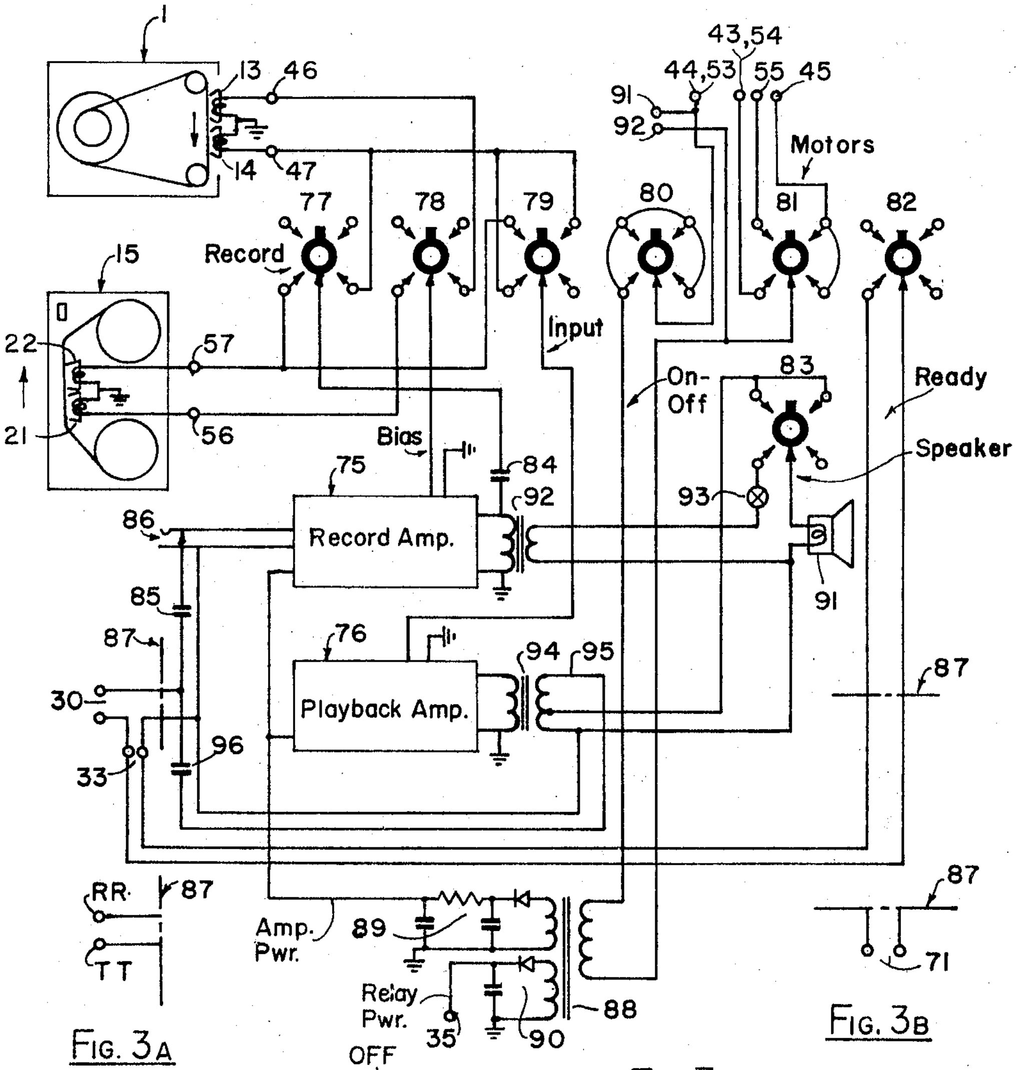
FIGURE 3 is a circuit diagram of the record/playback head and erase head, amplifiers, switching arrangement of the amplifiers, and power supply for the amplifiers, motors and relays, used generally with the several tape deck configurations and modes of operation of timing of the announcement and messages of this invention.
FIGURE 3A shows the termination of the signal portion of the amplifiers when used with the recorder coupler.
FIGURE 3B shows the termination of the ready switch permitting automatic answering, when used with the recorder coupler.

In FIG. 3 separate record amplifier 75 and playback amplifier 76 are used instead of using one amplifier to perform both functions with electrical switching thereby reducing circuit complexity, improving reliability and probably reducing costs. Three or four amplifiers can be used but the gain in efficiency over two amplifiers is probably nil. Both amplifiers are transistorized for instant response; electron tubes can be used if kept constantly heated or at standby warm condition but such units work much hotter than transistors and the tubes require frequent replacement.

Rotary multigang switches 77 through 83 are ganged; for convenience in description, each switch is considered to be on a separate wafer. The five positions of switches 77 through 83 are shown in FIG. 4 and the terminals in each wafer correspond to the indicated functions, namely, automatic answer, message playback, off, announce check and announce record. Switch 77 takes output from record amplifier 75 to record/playback heads 14 or 22 through condenser 84. The input to record amplifier comes from telephone line 30 or from the recorder coupler 65 terminals RR and TT in FIG. 3A, both through condenser 84 and microphone jack 86 which is used for recording announcements. Line 87 is the dividing line for either of the two inputs, the telephone line 30 or recorder coupler 65 input RR and TT, in FIGS. 3 and 3A.

Switch 78 sends high frequency bias to erase heads 13 or 21 from record amplifier 75. Switch 79 is for playback amplifier 76 input taken from either record/playback head 14 or 22. Switch 80 is an on-off switch for A.C. to the primary of power supply transformer 88, one secondary of which is used for filtered amplifier D.C. using rectifier, resistor, condenser network 89 and the other secondary for relay power supply using rectifier, condeser network 90 to terminal 35.

Switch 81 provides alternating current power to announcement and tape deck motors 2 and 18 on decks 1 and 15, from A.C. line terminals 91 and 92. Terminals 44 and 53 are common to both decks. Terminals 43 and 54 lead to normally open relay contacts of both decks. Terminals 55 and 45 lead to the playback deck 15 and announce deck 1, respectively, and override the relays for message playback and announcement record and check. Switch 82 is the ready switch, which, when closed, allows ring up current to flow to relay 31 and the telephone signal to go to record amplifier 75 input and playback amplifier 76 output; line 87 shows the dividing line for either of the two conditions, to telephone line 30 or to recorder coupler 65 through terminals 71, permitting a shunt across RDY1 and RDY2, for a ready signal. See FIG. 3B.

Switch 83 controls the input to speaker 91; from record amplifier 75 output transformer 92 through switch 93 for monitoring the incoming calls; from playback amplifier 76 output transformer 94, for message playback and announcement check. Lead 95 couples the output of amplifier 76 to the line through condenser 96, carrying the announcement.

The physical arrangement of the answering device panel is shown in FIG. 5 wherein the large knob is coupled to the switch wafers 77 through 83 in the various phases of operation of the device. Rewind lever 24 has been described. Monitor switch 93 is a toggle switch on the panel.

Only one sensing tape switch is used in FIGS. 5 and 6 having the advantage of improved reliability since relay failure by sticking, etc. is less frequent than tape contact failure; the overall economy is better even though one more relay is needed. The operation of the arrangement of FIG. 5, from telephone line 30 through delay switch 37 and relay 38 is in all respects similar to the description for the FIG. 2 arrangement to the same point.

Contacts 42 of relay 38 close and start tape deck 1 motor 2, by allowing alternating current flow from terminals 43, 44 and 45 from FIG. 3. Tape 4 and 6 starts in its cycle and tape 4 plays the announcement to the caller. At the conclusion of the announcement period, sensing tape 5 closes contacts of sensing tape switch 11 sending a relay current impulse to mechanical latching relay 100, causing it to go from resting (standby and announcement) position I to position II, which is the message record position. This relay is Potter & Brumfield Series PA or PC which operates on a 30 millisecond impulse or longer. While electrical latching relays may be used instead of mechanical latching, the arrangement is more cumbersome.

In position II, relay current flows through contacts 101 of relay 100 to relay 103 and normally closed contacts 107 which latches through normally open contacts 104. In position II, alternating current flows to tape deck 15 through contacts 102 of relay 100 from terminals 53, 54 and 55 from FIG. 3.

Tape 6 which times the message record duration is blank and not magnetically coated to reduce noise; it should be graphite lubricated. This message record period is say 30 seconds. At the conclusion of the message period, sensing tape 7 which is also on the outer portion of tape 6 crosses sensing tape switch 11 closing the contacts and sending a second relay current impulse to mechanical latching relay 100, returning contacts 101 and 102 to resting position I. This stops current to message tape deck 15, stopping the tape 25.

Relay current now flows from terminal 35 through contacts 101 in position I through contacts 105 of relay 103 which are latched closed, to relay 106 which opens normally closed contacts 107 and unlatches relays 38 and 103. The announcement tape deck 1 stops through contacts 42 and line seizure is released through contacts 40, restoring the answering device to standby in normal automatic answering position. Lamp 108 is lit in position II, message record. Connections to the erase and bias heads, 46, 47, 56 and 57 are the same as in previous deck switching arrangement, FIG. 2 and go to FIG. 3.

In FIG. 6 telephone line 30 is connected to recorder coupler 65. Leads 66 are connected to the associated telephone set. Terminals RR and TT carry the announcement from and the messages to the answering device amplifiers and switching arrangement of FIGS. 3, 3A and 3B. Ring up current closes RU to RU2, allowing current flow through and closing time delay switch 37 contacts, sending current to relay 38 through normally closed contacts 110 and closing normally open contacts 39, 40 aind 42, and latching relay 38 after a delay period. Closed contacts 40 connected to ST1 and ST2 on coupler 65 start start the cycle, opening RU and RU2 after about 1 second and effect line seizure by allowing direct current flow in telephone line 30 and closing internal contacts connected to LS and LS2 after line seizure. Contacts 42 permit alternating current to flow to announcement tape deck 1 from terminals 43 and 44 as described for the FIG. 2 arrangement, connecting to the FIG. 3 system.

Tape 4 and 6 starts in its cycle and tape 4 plays the announcement to the caller for say 15 seconds. At the conclusion of the announcement period, sensing tape 5 on the outer side of tape 4 closes contacts of sensing tape switch 11 sending a relay current impulse to mechanical latching relay 100, causing it to go from resting (standby and announcement) position I to message record position II. In this position, relay current flows through contacts 101 of relay 100 to relay 103 through terminals LS and LS2 and internally closed contacts in coupler 65 which latches through normally open contacts 104; alternating current flows to message tape deck 15 through contacts 102 of relay 100 from terminals 53 and 54 from FIG. 3. Contacts 109 of relay 103 close, shunting terminals TR1 and TR2, turning the recorder coupler amplifier around and causing a one second beep tone to go to the telephone line 30. Contacts 105 close, readying operation of relay 106.

Tape 6 times the message duration of say 30 seconds, at the conclusion of which, sensing tape 7 which is also on the outer position of tape 6, crosses sensing tape switch 11, closing the contacts and sending a second relay current impulse to mechanical latching relay 100, returning contacts 101 and 102 to resting position I. Contacts 101 in position I stop A.C. flow to message tape deck 15, stopping message tape 25. Relay current now flows from terminal 35 through contacts 101 in position I through contacts 105 of relay 103 which are latched closed, to relay 106 which opens normally closed contacts 107 and 110.

Open contacts 110 unlatch relay 38, stopping A.C. to announce tape deck 1. Open contacts 107 interrupt current flow through terminals RDY1 and RDY2 and terminals 71 which are in series with closed ready switch in FIG. 4. Opening ready terminals causes a one second beep to be transmitted to the line and after about two seconds causes the opening of recorder coupler 65 internal contacts connected to terminals LS and LS2, which unlatches relay 103. Lamp 108 is lit during the message record period.

In some central offices, a premature hang up by the calling party, that is before the approximately 45 seconds of the cycle, will cause line seizure in the recorder coupler to be released. With minor wiring changes, the answering device may be connected to the recorder coupler to prevent response to ring up before the cycle is completed. It is also possible to wire the circuit of FIG. 2 to the recorder coupler to restart after premature hang up after the completion of only one announcement cycle, that is, 15 seconds or so.

It may be seen that the tape deck switching arrangement of FIG. 2 may be wired to a recorder coupler; timing the announcement on tape deck 1 and the message period on tape deck 15.

In another invention, the arrangements of FIGS. 5 and 6 are modified to use additional lengths of sensing tape on the announcement tape of deck 1 in conjunction with mechanical latching relays or stepping relays to perform additional functions, as for example, to include the time delay function on the announcement tape. It is also possible with the addition of lengths of sensing tape to actuate a tone oscillator or to ready the device for callback of messages by a tone sent to the device by a caller.

It will be understood that electronic circuits and solid state switches, low current pilot relays and the like may be substituted or incorporated in the described circuits or used in conjunction with the impulse sensitive elements and timing arrangement described herein without departing from the spirit of the invention.

I claim:

1. A telephone answering device connected to the telephone line for reproducing an announcement and recording messages, comprising endless tape announcement reproducig means, an endless tape within said endless tape announcement reproducing means, time delay latching means actuated by ring up current in said telephone line causing line seizure and starting said endless tape announcement reproducing means, a first impulse generating element on said endless tape located at the conclusion of said announcement, a first impulse sensitive element adjacent said endless tape, message recording means, a message recording tape within said message recording means, a plurality of second impulse generating elements on said message recording tape spaced along said tape at the conclusion of each predetermined message interval, a second impulse sensitive element adjacent said message recording tape, second latching switching means actuated by the passage of said first impulse generating element across said first impulse sensitive element, latching said second latching switching means stopping said endless tape announcement reproducing means and starting said message recording means, disconnect switching means actuated by the passage of said plurality of second impulse generating elements across said second impluse sensitive element, unlatching said time delay latching means which releases line seizure and unlatching said second latching switching means thereby stopping said message recording means and readying said answering device for the next call, manually operated switching means, rewind means and playback means for playing back said recorded messages and means for recording and checking said announcement.

2. In the answering device of claim 1, message tape recording means comprising an endless loop message recording means and fast forward means to return said endless loop message recording means to the start for message playback.

3. A telephone answering device connected to the telephone line through a recorder coupler for reproducing an announcement and recording messages, comprising endless tape announcement reproducirg means, an endless tape within said endless tape announcement reproducing means, a first length of sensing tape located on said endless tape at the conclusion of said announcement, a blank message timing portion on said endless tape, a second length of sensing tape located on said endless tape at the conclusion of said blank message timing portion, time delay latching means actuated by a ring up impulse from said recorder coupler causing line seizure through a start connection on said recorder coupler and starting said endless tape announcement reproducing means, a sensing tape switch actuated by said first and second lengths of sensing tape, message tape recording means, mechanical latching switching means actuated by the passage of said first length of sensing tape across said sensing tape switch, from a first resting position to a second message record position, starting said message tape recording means and giving a transfer signal to said recorder coupler, switching means latched into a record-disconnect position by said mechanical latching switching means in said second message record position, said mechanical latching switchirg means actuated by the passage of said second length of sensing tape across said sensing tape switch, from said second message record position back to said first resting position, disconnect switching means, said mechanical latching switching means giving an impulse in said first resting position through said latched switching means to said disconnect switching means, said disconnect switching means unlatching said time delay latching means and giving a disconnect signal to said recorder coupler, releasing line seizure and opening line seizure contacts within said recorder coupler, said opened line seizure contacts unlatching said latched switching means, said unlatched time delay latching means stopping said endless tape announcement reproducing means and said mechanical latching switching means in said first resting position stopping said message tape recording means, thereby readying said answering device for the next call, manually operated switching means for answering, playback, announcement record and check, rewind means and playback means for playing back said recorded messages and means for recording and checking said announcement.

4. In the answering device of claim 4, message tape recording means comprising endless loop message recording means, an endless loop message tape within said endless loop message recording means, a length of sensing tape on said endless loop message, a sensing tape switch adjacent said endless loop message tape, fast forward means to return said endless loop message tape to the start, for message playback, a start switch, latching switching means actuated by said start switch and starting said fast forward means, said latching switching means unlatched by the passage of said sensing tape across said sensing tape switch, stopping said fast forward means.

5. A telephone answering device connected to the telephone line for reproducing an announcement and recording messages, comprising endless tape announcement reproducing means, an endless tape within said endless tape announcement reproducing means containing an announcement portion and a message duration timing portion, a first impulse generating element located on said endless tape at the conclusion of said announcement portion, a second impulse generating element located on said endless tape at the conclusion of said message duration timing portion, an impulse sensitive element adjacent said tape, message tape recording means, first switching means actuated by ring up current in said telephone line causing line seizure and starting said endless tape announcement reproducing means, second switching means actuated by the passage of said first impulse generating element across said impulse sensitive element at the conclusion of said announcement portion (a) to start said message tape recording means, said second switching means actuated by the passage of said second impulse generating element across said impulse sensitive element at the conclusion of said message duration timing potrion (b) to stop said endless tape reproducing means, (c) to stop said message tape recording means, and (d) to open said first switching means to release line seizure, thereby restoring said device to standby automatic answering position.

References Cited

UNITED STATES PATENTS

| | | | |
|---|---|---|---|
| 3,310,629 | 3/1967 | Yamamoto et al. | 179—6 |
| 3,337,690 | 8/1967 | Martin | 179—6 |
| 3,127,474 | 3/1964 | Waldman | 179—6 |
| 2,935,566 | 5/1960 | Karl | 179—6 |
| 2,937,237 | 5/1960 | Zanardo | 179—6 |
| 3,133,992 | 5/1964 | Dickman | 179—6 |
| 3,226,478 | 12/1965 | Martin et al. | 179—6 |
| 3,248,482 | 4/1966 | Kamborian | 179—6 |
| 3,293,365 | 12/1966 | Mitsui | 179—6 |
| 3,344,234 | 9/1967 | Salzberg et al. | 179—6 |

OTHER REFERENCES

Spratt: Simple Telephone Answering Machine, Wireless World, July 1956, pp. 344–346.

BERNARD KONICK, *Primary Examiner.*

R. F. CARDILLO, JR., *Assistant Examiner.*